United States Patent Office 3,551,446
Patented Dec. 29, 1970

3,551,446
1-ARYLOXYALKYLCARBONYL-3-INDOLYL
ALIPHATIC ACID DERIVATIVES
Hisao Yamamoto, Nishinomiya-shi, Yasushi Nakamura, Hirakata-shi, Masaru Nakao, Osaka, and Tsuyoshi Kobayashi, Minoo-shi, Japan, assignors to Sumitomo Chemical Company, Ltd., Osaka, Japan, a corporation of Japan
No Drawing. Filed June 8, 1967, Ser. No. 644,494
Claims priority, application Japan, June 10, 1966, 41/37,628; June 30, 1966, 41/42,720, 41/42,722; July 21, 1966, 41/48,062; Jan. 10, 1967, 42/2,058, 42/2,059; Jan. 11, 1967, 42/2,370; Jan. 13, 1967, 42/2,618; Mar. 1, 1967, 42/13,328, 42/13,329; Mar. 6, 1967, 42/14,346, 42/14,347
Int. Cl. C07d 27/56
U.S. Cl. 260—326.13     2 Claims

ABSTRACT OF THE DISCLOSURE

A 1-acyl-3-indolyl aliphatic acid derivative having antiinflammatory and anticholesterolemic effects which is characterized in that the 1-acyl-substituent is an aryloxyalkylcarbonyl or an arylthioalkylcarbonyl group, of which aromatic ring may be unsubstituted or substituted by a lower alkyl, a lower alkoxy or a lower alkylthio, and the mentioned alkylcarbonyl group has up to 6 carbon atoms, and processes for producing such compound.

The present invention relates to novel N-substituted indole derivatives having high antiinflammatory, antipyretic, analgesic and anticholesterolemic activities and to processes for producing the same. More particularly, the present invention relates to novel 1-aryloxyalkylcarbonyl-3-indolyl aliphatic acid derivatives or 1-arylthioalkylcarbonyl-3-indolyl aliphatic acid derivatives and processes for producing the same.

Of the developed nonsteroidal antiinflammatory compounds, 1-(p-chlorobenzoyl)-2-methyl-5-methoxy-3-indolylacetic acid is the greatest antiinflammatory activity, but it is remarkably high in acute and chronic toxicities. The present inventors observed that even when 10 mg./kg. of the said compound was orally administrated to animals, occult bleeding was observed in feces. In addition thereto, all the conventional antiinflammatory compounds tend to promote the bleeding of digestive organs and not few examples have been reported that perfolations of stomach and intestine brought one to death. Further, 1,2 - diphenyl - 3,5 - dioxo-4-n-butylpyrazolidine (phenylbutazone), which is most widely used as antiphlogistic at present, has low activity in comparison with its high acute toxicity and hence is considerably small in therapeutic ratio.

The synthesis of indole derivatives having acyl groups at the N-positions is described in, for example, Elderfield: "Heterocyclic Compounds," vol. 3 (1952), Chapter 1, pages 1–247, and W. C. Sumpter and F. M. Miller: "Heterocyclic Compounds with Indole and Carbazole Systems" (1954), pages 1–69. 1-substituted acyl groups of 1-acyl-indole derivatives are so easily hydrolyzed by acid or alkali that it has been considered impossible to obtain 1-acyl-indole derivatives directly from corresponding $N^1$-acylated phenylhydrazine derivatives by Fischer's indolization. Suvorov et al. [Suvorov et al.: Doklady Acad. Nauk U.S.S.R., 136, 840 (1961), Chem. Abstr., 55, 17621 (1961), J. Gen. Chem., U.S.S.R., 28, 1058 (1958)] have recently reported this problem as follows:

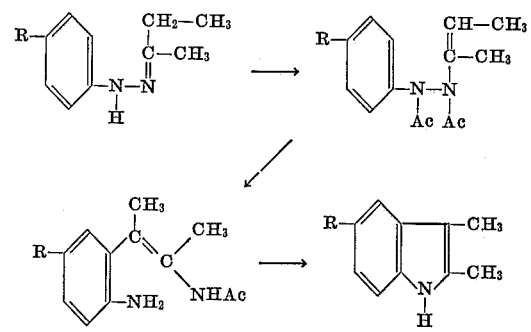

The present inventors prepared many 1-acyl-3-indolyl aliphatic acid derivatives and tested various kinds of pharamacological effects thereof. As a result, the present inventors found that novel 1-acyl-3-indolyl aliphatic acid derivatives having high antiinflammatory, antipyretic, analgesic and anticholesterolemic activities were prepared by novel or known processes.

One object of the present invention is to provide novel 1-acyl-3-indolyl aliphatic acid derivatives having high antiinflammatory, antipyretic, analgesic and anticholesterolemic activities and processes for producing such derivatives. Another object of the present invention is to provide processes for economically manufacturing these compounds in a high yield. A further object of the present invention is to provide a novel pharmaceutical composition containing these compounds as an effective ingredient. Other objects will be apparent from a following description.

In order to accomplish these objects, the present invention provides novel 1-acyl-3-indolyl aliphatic acid derivatives of the formula:

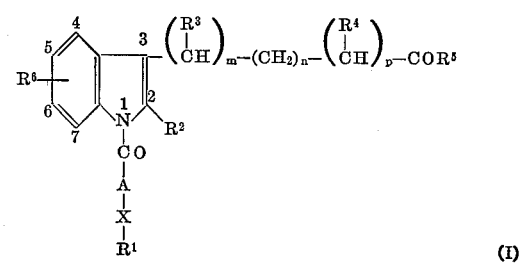

(I)

wherein $R^1$ is an unsubstituted or a lower alkyl-, lower alkoxy-, lower alkylthio- or halogen-substituted aromatic ring group, each of said alkyl, alkoxy and alkylthio substituents containing up to 4 carbon atoms; $R^2$ and $R^3$ are, respectively, hydrogen atoms or alkyl groups having up to 3 carbon atoms; $R^4$ is a hydrogen atom or an alkoxycarbonyl group having up to 4 carbon atoms; $R^5$ is a hydroxy group, an alkoxy group having up to 4 carbon atoms, a benzyloxy group, a tetrahydropyranyloxy group or an amino group; $R^6$ is a hydrogen atom, a halogen atom, an alkyl group having up to 4 carbon atoms an alkoxy group having up to 4 carbon atoms or an alkylthio group having up to 4 carbon atoms, A is an unsubstituted saturated hydrocarbon chain having up to 5 carbon atoms or an unsubstituted unsaturated hydrocarbon chain having up to 5 carbon atoms, the hydrocarbon chain being a straight one or a branched one; X is an oxygen atom or a sulfur atom; $m$ and $p$ are, respectively, 1 or 1; and $n$ is 0 or an integer of 1 to 3.

Further, the present invention provides a process for producing a novel 1-acyl-3-indolyl aliphatic acid derivative represented by the Formula I, which comprises reacting an $N^1$-acylated phenylhydrazine derivative of the formula:

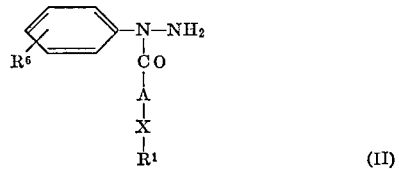
(II)

wherein $R^1$, $R^6$, A and X have the same meanings as defined above, or a salt thereof with a keto-aliphatic acid derivative of the formula:

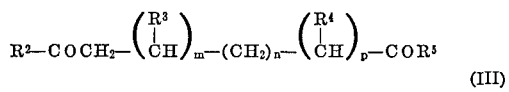
(III)

wherein $R^2$, $R^3$, $R^4$, $R^5$, $m$, $n$, and $p$ have the same meanings as identified above, to yield the 1-acyl-3-indolyl aliphatic derivative (I).

Still further, the present invention provides a process for producing a novel 1-acyl-3-indolyl aliphatic acid derivative represented by the Formula I, which comprises decomposing an $N^1$-acylated phenylhydrazone derivative of the formula:

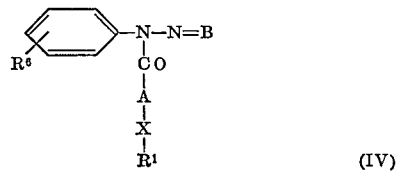
(IV)

wherein $R^1$, $R^6$, A and X have the same meanings as identified above, and B is a ketone or aldehyde residue, with an acid to yield an $N^1$-acylated phenylhydrazine derivative of the formula:

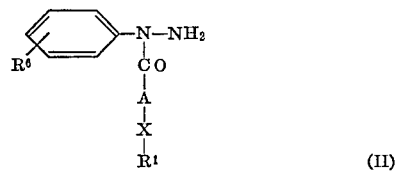
(II)

wherein $R^1$, $R^6$, A and X have the same meanings as identified above, and reacting the resultant $N^1$-acylated phenylhydrazine derivative represented by the Formula II with a keto-aliphatic acid derivative represented by the Formula III to yield an 1-acyl-3-indolyl aliphatic acid derivative (I).

Still further, the present invention provides a process for producing a novel 1-acyl-3-indolyl aliphatic acid derivative represented by the Formula I, which comprises reacting a phenylhydrazone derivative of the formula:

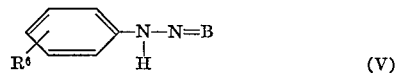
(V)

wherein $R^6$ and B have the same meanings as identified above with a compound having the formula:

(VI)

wherein $R^1$, A and X have the same meanings as identified above and Y represents a halogen or an ester residue, to yield an $N^1$-acylated phenylhydrazone derivative represented by the Formula IV decomposing the resultant $N^1$- acylated phenylhydrazone derivative with an acid to yield an $N^1$-acylated phenylhydrazine derivative represented by the Formula II, and reacting the resultant $N^1$-acylated phenylhydrazine derivative represented by the Formula II with a keto-aliphatic acid derivative represented by the Formula III to yield the 1-acyl-3-indolyl aliphatic acid derivative (I).

Still further, the present invention provides a process for producing a novel 1-acyl-3-indolyl aliphatic acid derivative of the Formula I, which comprises reacting a phenylhydrazine derivative of the formula:

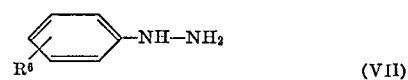
(VII)

wherein $R^6$ has the same meaning as identified above, with a compound having the Formula VI to yield an $N^1$-acylated phenylhydrazine derivative of the Formula II and reacting the resultant $N^1$-acylated phenylhydrazine derivative (II) with an aliphatic acid derivative of the Formula III to yield an 1-acyl-3-indolyl aliphatic acid derivative (I).

Still further, the present invention provides a process for producing a novel 1-acyl-3-indolyl aliphatic acid derivative of the formula:

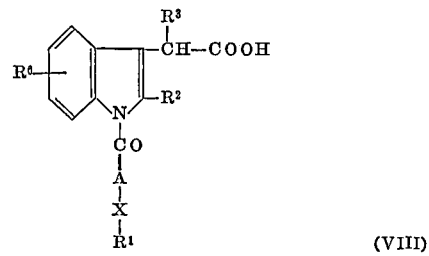
(VIII)

wherein $R^1$, $R^2$, $R^3$, A and X have the same meanings as identified above, which comprises reacting an $N^1$-acylated phenylhydrazine derivative of the Formula II with a compound of the formula:

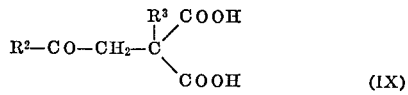
(IX)

or

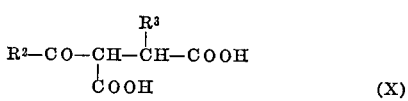
(X)

wherein $R^2$ and $R^3$ have the same meanings as identified above, to yield an 1-acyl-3-indolyl aliphatic acid derivative (VIII).

Still further, the present invention provides a process for producing a novel 1-acyl-3-indolyl aliphatic acid derivative of the Formula I, which comprises reacting a phenylhydrazine derivative of the Formula XI

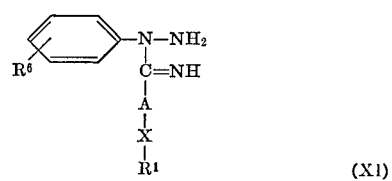
(XI)

wherein $R^1$, $R^6$, A and X have the same meanings as identified in the Formula I, with a keto-aliphatic acid derivative of the Formula III.

Still further, the present invention provides a process for producing a novel 1 - acyl - 3 - indolyl aliphatic acid derivative represented by the formula:

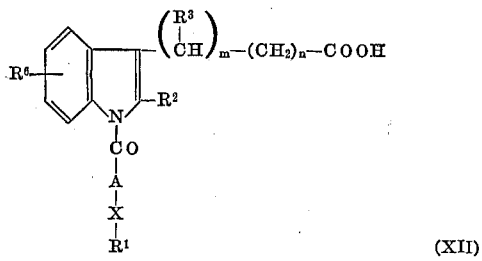

(XII)

wherein $R^1$, $R^2$, $R^3$, $R^6$, A, X, $m$ and $n$ have the same meanings as identified in the Formula I, which comprises converting a compound represented by the formula:

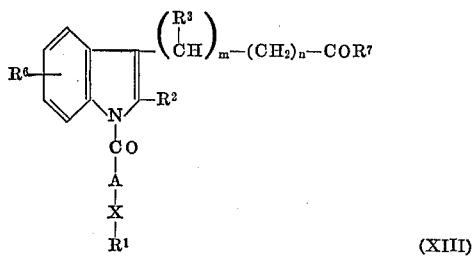

(XIII)

wherein $R^1$, $R^2$, $R^3$, $R^6$, A, X, $m$ and $n$ have the same meanings as identified above; and $R^7$ represents an alkoxy, tetrahydropyranyloxy, benzyloxy or amino, to a 1-acyl-3-indolyl aliphatic acid derivative (IX).

Still further, the present invention provides a process for preparing a novel 1-acyl-3-indolyl aliphatic acid derivative represented by the Formula VIII, which comprises oxidizing an indole -3-aliphatic aldehyde derivative represented by the formula:

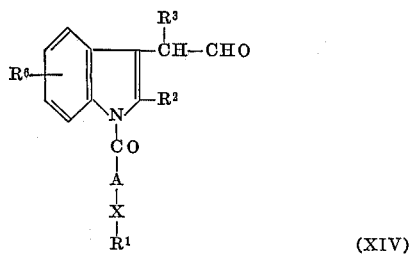

(XIV)

wherein $R^1$, $R^2$, $R^3$, $R^6$, A and X have the same meanings as identified above.

Still further, the present invention provides a process for preparing a novel 1-acyl-3-indolyl aliphatic acid derivative of the said Formula VIII, which comprises oxidizing an indole-3-ethanol derivative of the formula:

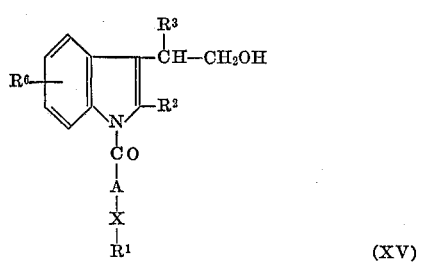

(XV)

wherein $R^1$, $R^2$, $R^3$, $R^6$, A and X have the same meanings as identified above, to yield an 1-acyl-3-indolyl aliphatic acid derivative of the said Formula VIII.

Still further, the present invention provides a process for preparing a novel 1-acyl-3-indolyl aliphatic acid derivative of the said Formula VIII, which comprises de- hydrogenating a 2,3-dihydro - 3 - indolyl aliphatic acid derivative of the formula:

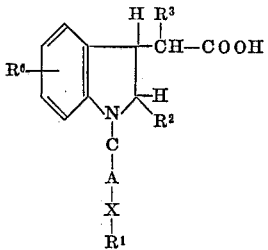

(XVI)

wherein $R^1$, $R^2$, $R^3$, $R^6$, A and X have the same meanings as identified above, to yield an 1-acyl-3-indolyl aliphatic acid derivative of the said Formula VIII.

Still further, the present invention provides a process for producing a novel 1-acyl-3-indolylacetic acid derivative of the formula:

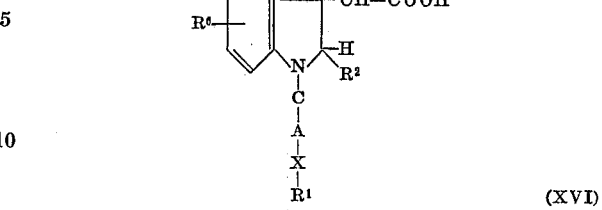

(XVII)

wherein $R^1$, $R^2$, $R^5$, $R^6$, A and X have the same meanings as identified above, which comprises converting a 2-hydro-3-hydroxy - 3 - indolylacetic acid derivative of the formula:

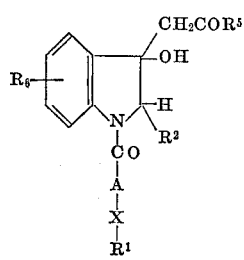

(XVIII)

wherein $R^1$, $R^2$, $R^5$, $R^6$, A and X have the same meanings as identified above, to an 1-acyl-3-indolylacetic acid derivative of the said Formula XVII by dehydrating or dehydrating and hydrolyzing thereafter.

Still further, the present invention provides a process for preparing a novel 1-acyl-3-indolyl aliphatic acid derivative of the Formula VIII, which comprises converting a γ-(N-acylanilino)-aliphatic acid derivative of the formula:

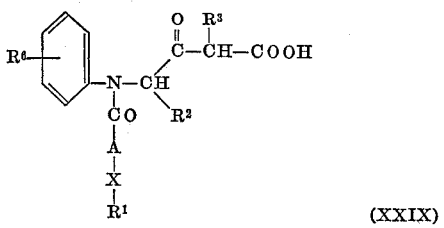

(XXIX)

wherein $R^1$, $R^2$, $R^3$, $R^6$, A and X have the same meanings as identified above, to an 1-acyl-3-indolylacetic acid derivative (VIII) by ring formation.

Furthermore the present invention provides a pharmaceutical composition containing an effective amount of the 3-idolyl aliphatic acid derivative of the Formula I, as the essential active ingredient, and a pharmaceutical acceptable carrier.

According to the present invention, an 1-acyl-3-idolyl aliphatic acid derivative represented by the Formula I is prepared by the reactions shown by the following equations:

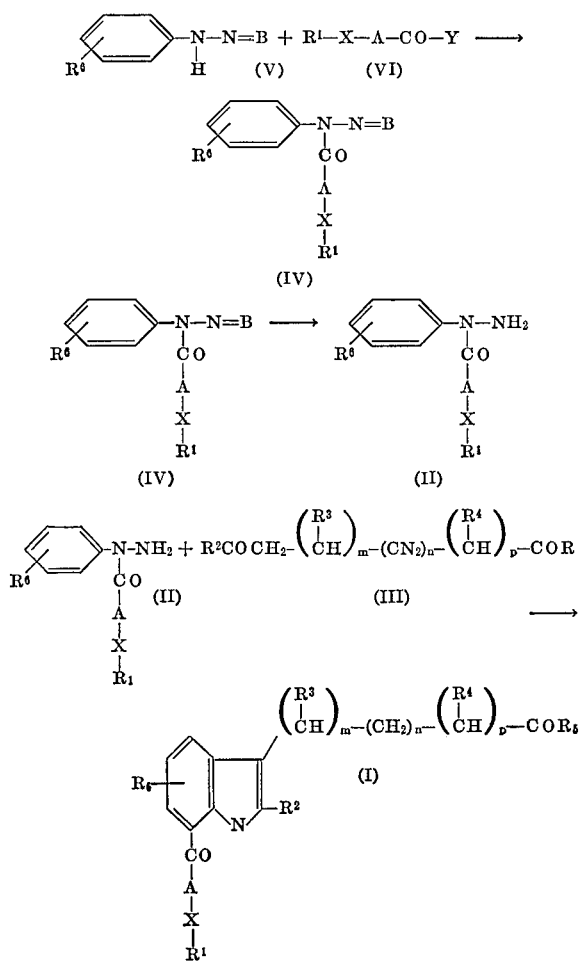

In the above formulae, $R^1$, $R^2$, $R^3$, $R^4$, $R^5$, $R^6$, A, B, X, Y, $m$, $n$ and $p$ have the same meanings as identified above.

In the processes of the present invention, $N^1$-acylated phenylhydrazine derivatives (II) and $N^1$-acylated phenylhydrazone derivatives (IV) may be synthesized by other processes than those disclosed herein. These intermediates, the compounds (II) and (IV), are novel compounds.

Next, the process of the present invention is explained in due order as follows.

Firstly, the reaction of a phenylhydrazone derivative (V) and a compound (VI) will be described.

The reaction of a phenylhydrazone derivative (V) with a compound (VI) is carried out in a basic solvent or in an inert solvent in the presence of a hydrogen halide acceptor. As the hydrogen halide acceptor, a tertiary amine, for example, pyridine or dimethylaniline can be used. These hydrogen halide acceptors themselves can be used as solvents. Inert solvents such as ether, benzene, toluene, and tetrahydrofuran are also able to be used as reaction solvents. At least an equimolar or larger amount of a hydrogen halide acceptor is required to accept the hydrogen halide which is produced in course of the reaction and to make the reaction proceed smoothly. The compound (VI) may be chloride, bromide, iodide or fluoride, and chloride is most preferable from commercial point of view. The reaction proceeds at a room temperature, and even below 0° C., and the yield is high. The exothermic reaction finishes in a few minutes or several hours. After the reaction finishes, the produced hydrogen halide salt of the hydrogen halide acceptor is filtered off and the filtrate is concentrated under reduced pressure, or the reaction mixture is poured into water or a solvent in which the aimed $N^1$-acylated phenylhydrazone is not dissolved, and the aimed $N^1$-acylated phenylhydrazone compound of the said Formula IV is easily obtained as crystals or an oily substance. These products can be purified by an appropriate solvent, for example, a solvent mixture of alcohol and water.

According to the method of the present invention, the following $N^1$-acylated phenylhydrazone compounds can be obtained in high yield.

Acetaldehyde $N^1$-(phenoxyacetyl)-$N^1$-(p-methoxyphenyl) hydrazone

Acetaldehyde $N^1$-(phenylthioacetyl)-$N^1$-(p-methoxyphenyl)hydrazone

Acetaldehyde $N^1$-(phenoxyacetyl)-$N^1$-(p-methylphenyl) hydrazone

Acetaldehyde $N^1$-(phenylthioacetyl)-$N^1$-(p-methylphenyl)hydrazone

Acetaldehyde $N^1$-(phenoxyacetyl)-$N^1$-(p-chlorophenyl) hydrazone

Acetaldehyde $N^1$-(phenoxyacetyl)-$N^1$-(p-methylthiophenyl)hydrazone

Acetaldehyde $N^1$-(p-chlorophenoxyacetyl)-$N^1$-(p-methoxyphenyl)hydrazone

Acetaldehyde $N^1$-(p-methylphenoxyacetyl)-$N^1$-(p-methoxyphenyl)hydrazone

Acetaldehyde $N^1$-(p-methoxyphenoxyacetyl)-$N^1$-(p-methoxyphenyl)hydrazone

Acetaldehyde $N^1$-($\gamma$-phenoxybutyryl)-$N^1$-(p-methoxyphenyl)hydrazone

Acetaldehyde $N^1$-(phenoxyacetyl)-$N^1$-(m-methoxyphenyl) hydrazone

Acetaldehyde $N^1$-(phenoxyacetyl)-$N^1$-(m-methylphenyl) hydrazone

Acetaldehyde $N^1$-($\beta$-phenoxypropionyl)-$N^1$-(p-methoxyphenyl)hydrazone

Benzaldehyde $N^1$-(phenoxyacetyl)-$N^1$-(p-methoxyphenyl) hydrazone

Chloral $N^1$-(phenoxyacetyl)-$N^1$-(p-methoxyphenyl)hydrazone

Methylethylketone $N^1$-(phenoxyacetyl)-$N^1$-(p-methoxyphenyl)hydrazone

Acetphenone $N^1$-(phenoxyacetyl)-$N^1$-(p-methoxyphenyl) hydrazone

Those novel $N^1$-acylated phenylhydrazone derivatives, which are obtained by the method of the present invention, have psychic, stimulating, antitumor, bactericidal, and fungicidal activities and they are very important compounds as intermediates for producing remarkably effective antiinflammatory and anticholesterolemic drugs, analgesics and antipyretics.

Next, the process for producing an $N^1$-acylated phenylhydrazine derivative (II) by decomposing an $N^1$-acylated phenylhydrazone derivative (IV) will be described.

An $N^1$-acylated phenylhydrazone derivative (IV) is dissolved or suspended in an adequate solvent, for example, methanol, ethanol, benzene or toluene. Thereto is added more than equivalent of an acid. As an acid, an inorganic acid or an organic acid can be used, among which an inorganic acid such as gaseous hydrogen chloride is preferable to give a good result. If hydrochloric acid is used, a HCl salt of the $N^1$-acylated phenylhydrazine derivative (II) precipitates as crystals in good yield. Sulfuric acid or others can be used in place of gaseous hydrogen chloride. When ether, benzene or toluene is used as the solvent, a small quantity of alcohol should be added to it.

The reaction temperature is preferably 0°–25° C., though may be below 0° C.

As the $N^1$-acylated phenylhydrazone derivative (IV), various compounds can be illustrated. For example, the hydrazones of acetaldehyde, chloral, benzaldehyde, acetal, ethyl acetoacetate and methoxy acetone can be easily decomposed in general cases to give the aimed $N^1$-acylated phenylhydrazine derivative (II). Among them, the hydrazone of acetaldehyde has especially distinctively commercial advantages.

According to the present invention, the following $N^1$-acylated phenylhydrazine derivatives (II), for example, can be obtained:

$N^1$-(phenoxyacetyl)-$N^1$-(p-methoxyphenyl)hydrazine
$N^1$-(phenoxyacetyl)-$N^1$-(m-methoxyphenyl)hydrazine
$N^1$-(phenoxyacetyl)-$N^1$-(m-methoxyphenyl)hydrazine
$N^1$-(phenylthioacetyl)-$N^1$-(p-methoxyphenyl)hydrazine
$N^1$-(phenoxyacetyl)-$N^1$-(p-methylphenyl)hydrazine
$N^1$-(phenylthioacetyl)-$N^1$-(p-methylphenyl)hydrazine
$N^1$(phenoxyacetyl)-$N^1$-(p-chlorophenyl)hydrazine
$N^1$-(phenoxyacetyl)-$N^1$-(p-methylthiophenyl)hydrazine
$N^1$(p-chlorophenoxyacetyl)-$N^1$-(p-methoxyphenyl)hydrazine
$N^1$-(p-methylphenoxyacetyl)-$N^1$-(p-methoxyphenyl)hydrazine
$N^1$-(p-methoxyphenoxyacetyl)-$N^1$-(p-methoxyphenyl)hydrazine
$N^1$-($\gamma$-phenoxybutyroyl)-$N^1$-(p-methoxyphenyl)hydrazine
$N^1$-($\beta$-phenoxypropionyl)-$N^1$-(p-methoxyphenyl)hydrazine Their salts, for example, hydrochlorides, sulphates and phosphates, can be easily obtained. All of them are novel compounds that have not been reported in any literature.

These compounds have psychic, stimulating, antitumor, bactericidal and fungicidal activities and further they are very important as intermediates for producing strong antiinflammatory and anticholesterolemic drugs, analgesics and antipyretics.

In some cases a novel $N^1$-acylated phenylhydrazine derivative (II) are directly obtained by reacting a phenylhydrazine derivative (VII),

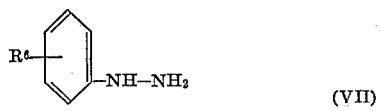

(VII)

wherein $R^6$ has the same meaning as identified in the Formula I, or a salt thereof, with a compound (VI)

$$R^1—X—A—CO—Y \quad (VI)$$

wherein $R^1$, A and X have the same meanings as identified in the said Formula I and Y is a halogen atom in this case, in the presence of a basic agent.

This reaction is carried out in a conventional solvent such as benzene, toluene, xylene, ether, dioxane or tetrahydrofuran in the presence of a hydrogen halide acceptor such as a tertiary amine. As the tertiary amine, triethyl amine, pyridine or dimethylaniline is suitable and equimolar or more of the acceptor than that of the said phenylhydrazine derivative (VII) is required.

This reaction proceeds so rapidly that the Compound VI is added slowly to a phenylhydrazine derivative (VII) in a suitable solvent while cooling. The reaction mixture is allowed to stand at the room temperature with stirring, if necessary, heated to complete the reaction. As a compound of the Formula VI, acid chloride, acid bromide, etc., can be used.

The $N^1$-acylated derivative (II) thus obtained is contaminated with a by-product such as $N^2$-acylated compound or $N^2,N^2$-diacylated compound. The reactions are shown, for example, as follows:

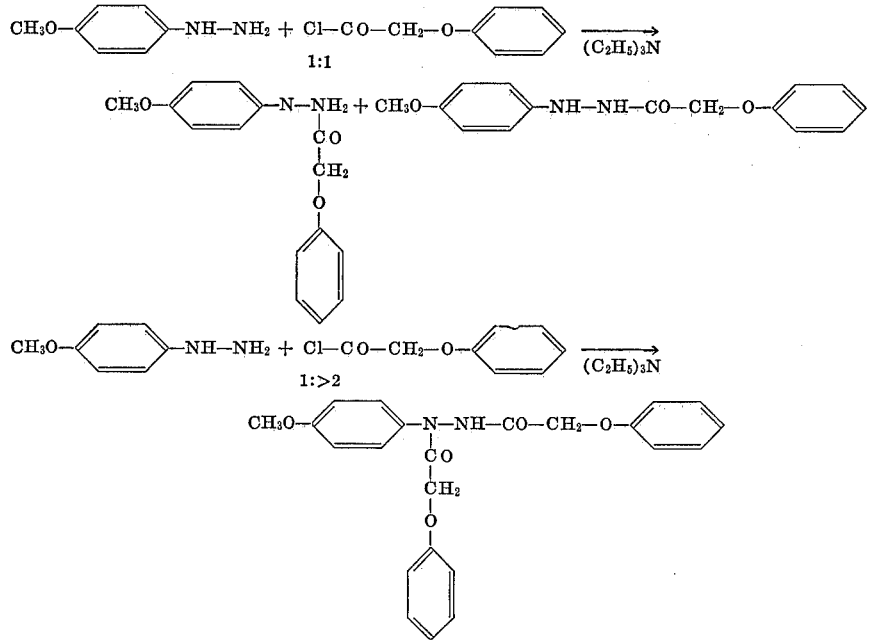

The objective $N^1$-acylated derivative (II) is easily separated from the by-products by their solubility differences in an organic solvent. However, the purification of the $N^1$-acylated compound is not necessary in the process, because only the $N^1$-acylated derivative is concerned with the following reaction in the present invention.

According to the process of the present invention the compounds having the following substituents, which are represented by $R^1$, $R^6$ and A in the said Formulae II, VI and VII are obtained.

$R^1$: phenyl, naphthyl, o-methylphenyl, m-methylphenyl, p-methylphenyl, o-methoxyphenyl, m-methoxyphenyl, p-methoxyphenyl, m-chlorophenyl, p-chlorophenyl, m,p-dimethoxyphenyl, m-methoxy-p-bromophenyl.

$R^6$: hydrogen, m-chloro-, p-chloro-, m-bromo-, p-methyl-, p-ethyl-, m-methyl-, m-methoxy-, p-methoxy-, p-ethoxy-, p-methylthio-, p-ethythio.

A: $—CH_2—$, $—CH_2—CH_2—$, $—CH_2—CH_2—CH_2—$,
$—CH_2—CH_2—CH_2—CH_2—$
$—CH_2—CH_2—CH_2—CH_2—CH_2—$.

X: oxygen or sulfur.

Next the process for producing a 1-acyl-3-indolyl aliphatic acid derivative (I) by the reaction of an $N^1$-acylated phenylhydrazine derivative (II) with an aliphatic acid derivative (III) will be described.

This reaction is carried out by heating in the presence of an adequate condensing agent or not in an organic solvent. The yield is very high.

The present reaction proceeds smoothly even without a solvent, but the reaction is more smoothly carried out in a solvent. An organic acid, for example, acetic acid, formic acid, propionic acid, lactic acid, butyric acid, a nonpolar organic solvent, for example, n-hexane, benzene or toluene, and other organic solvent, such as dioxane and dimethyl formamide can be used as a solvent of this reaction. When an alcohol is used as a solvent in this reaction, a corresponding ester of indole aliphatic acid is produced in some cases.

A 5-substituted indole derivative can be prepared in ring formation reaction of an N¹-para-substituted phenylhydrazine derivative, however in case an N¹-meta-substituted phenylhydrazine derivative is used, two isomers, 4- and 6-substituted indole derivatives can be obtained as follows:

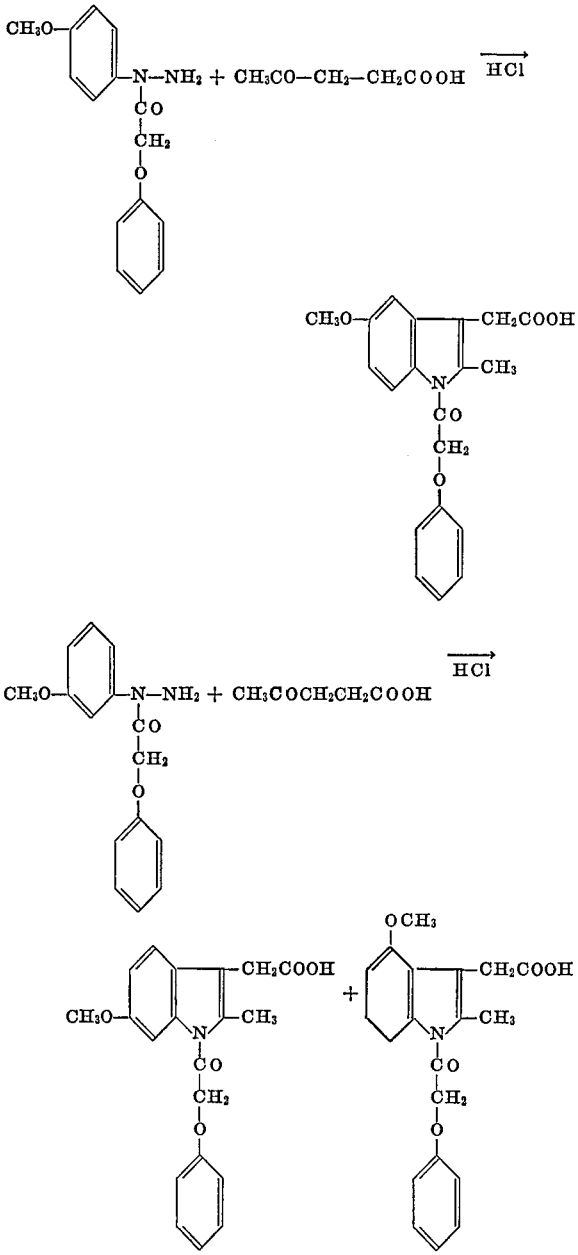

These isomers can be generally separated by column chromatography.

The reaction proceeds smoothly at a temperature within the range of 60° to 140° C. The reaction proceeds rapidly and is generally finished in a short period of reaction time, mostly in one or two hours. The condensing agent is not needed in some cases but desirable results are generally achieved by using a condensing agent. The condensing agent includes inorganic acids such as hydrochloric acid, sulfuric acid and phosphoric acid, metal halides such as zinc chloride and copper chloride, heavy metal powder such as copper powder, boron fluorides or polyphosphoric acid.

In after-treatment, the reaction mixture is allowed to stand at room temperature or in a refrigerator (about 5° C.), and then a large amount of crystals of the product is mostly obtained.

When crystals do not produce, the reaction mixture is concentrated under a reduced pressure, or water, acetic acid-water or petroleum ether is adequately added to the mixture. And then, beautiful crystals can be obtained. The produced crystals are collected by filtration and they are generally washed with an aqueous solution of acetic acid, alcohol-water, water or petroleum ether before they are dried. Ether, acetone, acetone-water, alcohol, alcohol-water, benzene and acetic acid are generally preferred as a solvent for recrystallization of the present compound. The crystal system varies with a kind of a recrystallization solvent. Objective products are generally crystalline, but oily products are sometimes given in the ester compounds.

Reaction solvents, reaction conditions, condensing agents and recrystallization solvents which have been mentioned above are only presented as illustrative of the present invention but not in its limitation, needless to speak of.

The compounds having following substituents are easily obtained in good yield, theoretically or in nearly theoretically, according to the process of the present invention.

$R^1$: phenyl, p-chlorophenyl, p-methylphenyl, p-methylthiophenyl, m-chlorophenyl, o-chlorophenyl, m-bromophenyl, o-bromophenyl, p-bromophenyl, p-ethylphenyl, m-methoxyphenyl, p-methoxyphenyl, o-methoxyphenyl, m,p-dimethoxyphenyl, 3,4,5-trimethoxyphenyl, m-methylthiophenyl, p-chloro-o-methylphenyl, α-naphthyl, β-naphthyl, m-methoxy-p-bromophenyl, p-ter.-butylphenyl, p-ter.-butylphenyl and 2,6-dimethyl-4-ter.-butylphenyl.

$R^2$: hydrogen, methyl, ethyl.
$R^3$: hydrogen, methyl, ethyl.
$R^6$: methoxy, ethoxy, propoxy, methyl, ethyl, isopropyl, ter.-butyl, methylthio, ethylthio, chloro, bromo, hydrogen.

X: oxygen, sulfur.

A: —CH₂—, —CH₂—, —CH₂—CH₂—CH₂—,

—CH₂—CH₂—CH₂—CH₂—,

—CH₂—CH₂—CH₂—CH₂—CH₂

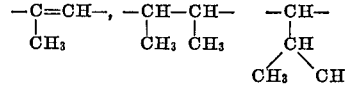

To be concrete, following compounds are easily prepared according to the process of the present invention.

1-phenoxyacetyl-2-methyl-5-methoxy-3-indolylacetic acid
1-phenoxyacetyl-5-methoxy-3-indolylacetic acid
γ-(1-phenoxyacetyl-2-methyl-5-methoxy-3-indolyl) butyric acid
β-(1-phenoxyacetyl-2-methyl-5-methoxy-3-indolyl) propionic acid
α-(1-phenoxyacetyl-2-methyl-5-methoxy-3-indolyl) propionic acid
1-phenoxyacetyl-2-methyl-5-chloro-indolylacetic acid
1-phenoxyacetyl-2,5-dimethyl-3-indolylacetic acid
1-phenoxyacetyl-2-methyl-5-methylthio-3-indolylacetic acid
1-phenoxyacetyl-2-methyl-5-methoxy-3-indolylacetamide
methyl 1-phenoxyacetyl-2-methyl-5-methoxy-3-indolylacetate
benzyl 1-phenoxyacetyl-2-methyl-5-methoxy-3-indolylacetate dimethyl 1-phenoxyacetyl-2-methyl-5-methoxy-3-indolyl-
  malonate
1-(p-chlorophenoxyacetyl)-2-methyl-5-methoxy-3-indolyl-
  acetic acid
1-(p-methylphenoxyacetyl)-2-methyl-5-methoxy-3-indolyl-
  acetic acid
1-(p-methoxyphenoxyacetyl)-2-methyl-5-methoxy-3-
  indolylacetic acid
1-(γ-phenoxybutyl)-2-methyl-5-methoxy-3-indolylacetic
  acid
1-(β-phenoxypropionyl)-2-methyl-5-methoxy-3-indolyl-
  acetic acid Many other 1-acyl-3-indolyl aliphatic acid derivatives can be thus synthesized.

Further in some cases a 1-acyl-3-indolylacetic acid derivative of the formula,

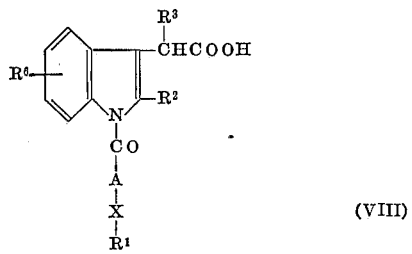

(VIII)

wherein $R^1$, $R^6$, A and X have the same meanings as identified in the Formula I, is prepared from an $N^1$-acyl phenylhydrazine derivative II or salt thereof and a keto-dicarboxylic acid of the Formula IX or X.

In this reaction, a phenylhydrazine derivative of the Formula II is heated with a keto-dicarboxylic acid of the Formula IX or X in the presence or absence of a condensing agent in an organic solvent or not. The reaction temperature is within the range of 45° to 200° C., preferably 60° to 140° C. As an organic solvent, organic acids such as formic acid, acetic acid, propionic acid and butyric acid, a hydrocarbon such as benzene, toluene, xylene, cyclohexane and n-hexane, dioxane, isopropyl ether, acetonitrile, butanol, ethyleneglycolether and the others can be used.

As a condensing agent, inorganic acids such as hydrochloric acid and sulfuric acid, metal halides such as zinc chloride and copper chloride, boron fluoride, polyphosphoric acid and the others can be used.

This process does not require a complicated manner or operation and the yield is remarkably high.

For example, this process is shown as follows:

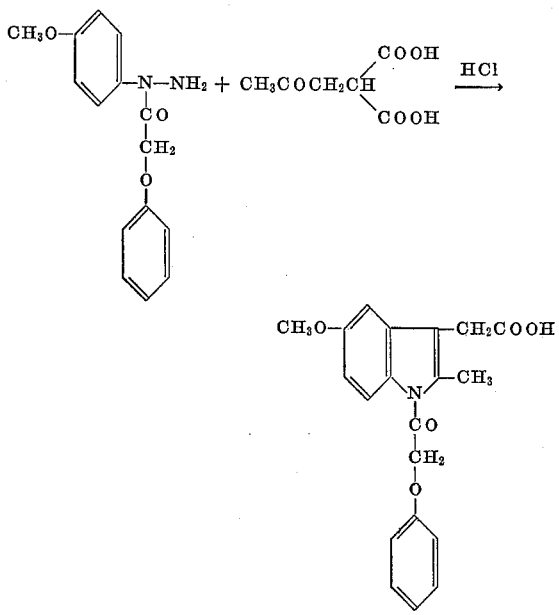

Still further, according to the present invention, a 1-acyl-3-indolyl aliphatic acid derivative represented by the Formula I is prepared from the phenylhydrazine derivative of the Formula XI or a salt thereof and an aliphatic acid derivative of the Formula III in the presence or absence of a suitable solvent, and in the presence or absence of a condensing agent.

In the reaction, suitable solvents are organic acids, such as acetic acid, formic acid, propionic acid and lactic acid, nonpolar solvents such as cyclohexane, n-hexane, benzene, toluene and xylene, ether compounds such as dioxane and diisopropyl ether or other conventional organic solvents. Suitable condensing agents or inorganic acids such as hydrochloric acid, sulfuric acid, phosphoric acid and hydrogen chloride, metal halides such as zinc chloride, copper chloride, a metal powder, such as copper powder, a Grignard's reagent, boron fluoride, polyphosphoric acid or an ion exchanger resin. However, it is not always necessary to use a solvent or a condensing agent. This indole ring formation proceeds under heating the reaction mixture at 45° to 200° C. Preferably, the reaction is continued at 60° to 140° C.

After completion of the reaction, the reaction mixture is allowed to cool, a large amount of crystals are generally precipitated. Even in case crystals are not produced, if the solvent is removed by distillation or water or petroleum ether is added to the reaction mixture, a large amount of crystals can be obtained. The crude crystals are collected by filtration, washed with water and thereafter recrystallized from a suitable solvent to give a pure objective product.

Still further, according to the present invention a 1-acyl-3-indolyl aliphatic acid derivative XII is obtained by converting an ester or amide derivative XIII of a corresponding 3-indolyl aliphatic acid XII.

For example, a benzyl ester of a 3-indolyl aliphatic acid is converted to a free 3-indolyl aliphatic acid derivative by hydrogenating with decomposition in the presence of a metal catalyst such a palladium.

If the alcohol moiety of the ester compound XIII is tertiary butyl alcohol or tetrahydropyranyl alcohol, the ester is treated with an arylsulfonic acid such as p-toluenesulfonic acid to yield an objective product.

This method is shown, for example, as following reaction formula,

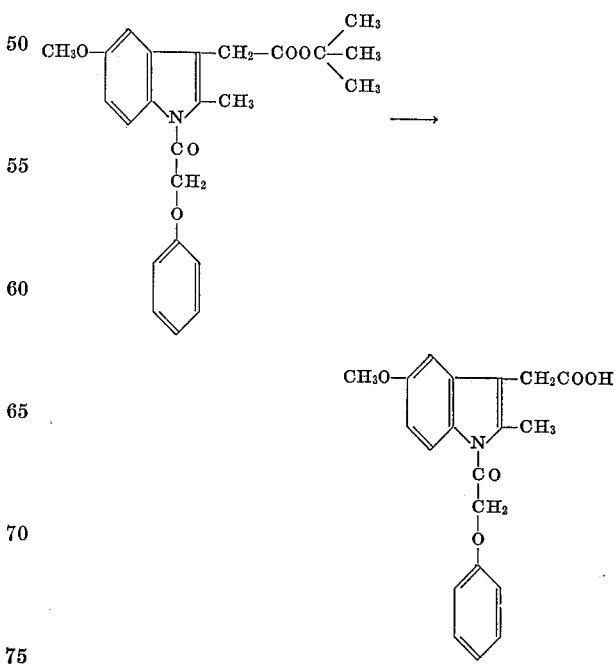

That is, if a tertiary butyl ester is only fused by heating, it is decomposed to yield an objective free 3-indolyl aliphatic acid derivative XII.

Sometimes a free 3-indolyl aliphatic acid compound may be obtained by treating an amide of the corresponding 3-indolyl aliphatic acid compound with a suitable amount of nitrous acid or its salt in an inert solvent.

The following compounds, for example, are prepared by this method.

1-(β-phenoxypropionoyl)-2-methyl-5-methoxy-3-indolylacetic acid
1-(γ-phenoxybutyryl)-2-methyl-5-methoxy-3-indolylacetic acid
1-phenylthioacetyl-2-methyl-5-methoxy-3-indolylacetic acid
1-(2'-bromophenoxyacetyl)-2-methyl-5-methoxy-3-indolylacetic acid
1-(3'-bromophenoxyacetyl)-2-methyl-5-methoxy-3-indolylacetic acid
1-(4'-bromophenoxyacetyl)-2-methyl-5-methoxy-3-indolylacetic acid
A mixture of 1-phenoxyacetyl-2,4-dimethyl-3-indolylacetic acid and 1-phenoxyacetyl-2,6-dimethyl-3-indolylacetic acid
1-(2'-chlorophenoxyacetyl)-2-methyl-5-methoxy-3-indolylacetic acid
1-(4'-chlorophenoxyacetyl)-2-methyl-5-methoxy-3-indolylactic acid
1-phenoxyacetyl-2-methyl-5-methoxy-3-indolylacetic acid
1-phenoxyacetyl-5-methyl-3-indolylacetic acid
γ-(1-phenoxyacetyl-2-methyl-5-chloro-3-indolyl)butyric acid
β-(1-phenoxyacetyl-2-methyl-5-methylthio-3-indolyl)propionic acid
α-(1-phenoxyacetyl-2-methyl-5-methoxy-3-indolyl)propionic acid Still further, according to the present invention, a 1-acyl-3-indolyl aliphatic acid derivative represented by the Formula VIII can be prepared by oxidizing an indolyl-3-acetaldehyde derivative represented by the Formula XIV.

In this process of the present invention, potassium premanganate, hydrogen peroxide, an organic peroxide, silveroxide, selenium dioxide and copper hydroxide can be used as an oxidizing agent, and especially potassium permanganate or copper hydroxide is most preferable in many cases.

An indole-3-acetaldehyde derivative XIV, which is a starting substance of this method, can be prepared according to the following reaction process:

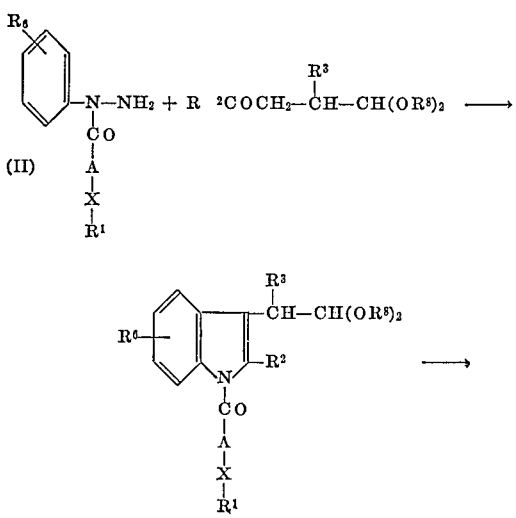

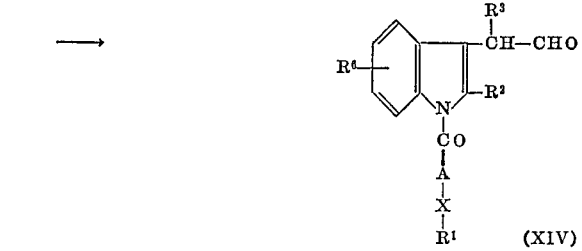

wherein $R^1$, $R^2$, $R^3$, $R^6$, A and X have the same meanings as identified above; and $R^8$ means a lower alkyl group.

Still further, according to the present invention, a 1-acyl-3-indolylacetic acid derivative of the Formula VIII is prepared by oxidizing the corresponding indole-3-ethanol derivative of the Formula XV.

That is, an indole-3-ethanol derivative XV is oxidized by potassium permanganate or chromic acid to give a 1-acyl-3-indolylacetic acid derivative VIII in good yield.

The indole-3-ethanol derivative XV, a starting compound of this method, is prepared by following reaction process:

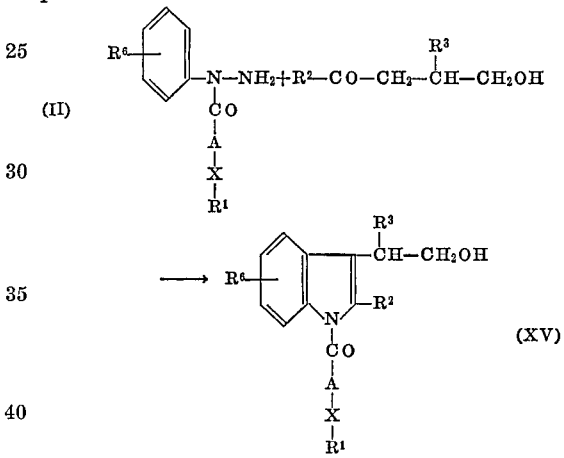

wherein $R^1$, $R^2$, $R^3$, $R^6$, A and X have the same meanings as identified above.

Still further, according to the present invention, a 1-acyl-3-indolylacetic acid derivative VIII is prepared by dehydrogenation of the corresponding 2,3-dihydro-3-indolylacetic acid derivative XVI.

In this dehydrogenation, non-polar solvents such as benzene, xylene and toluene and other various organic solvents such as acetone, acetic acid, and chloroform can be used.

As agents for the dehydrogenation, chloranil, selenium dioxide, halogen and the like oxidizing agents can be used. A reaction temperature within the range of 40° to 150° C. is preferable.

A starting substance, 1-acyl-2,3-dihydro-3-indolyl aliphatic acid derivative XVI is obtained in a high yield by reacting a 2,3-dihydro-3-indolyl aliphatic acid derivative with a corresponding acyl chloride in the presence of a hydrogen chloride acceptor.

Still further, according to the present invention a 1-acyl-3-indolylacetic acid derivative of the Formula XVII is prepared by dehydration of a 2-hydro-3-hydroxy-3-indolylacetic acid derivative of the Formula XVIII and then, if necessary, by hydrolysis of the resultant ester compound.

The reaction proceeds in an inert solvent at a temperature within the range of 70° to 200° C. However, if a reaction does not proceed smoothly, the Compound XVIII is azeotropically refluxed with an azeotropic solvent, for example, benzene, toluene or xylene, or is heated in the presence of a suitable dehydrating agent, for example, a proper amount of anhydrous phosphoric acid, whereby a dehydration reaction takes place.

When a 1-acyl-3-indolylacetic acid derivative XVII, in which R⁵ is an alkyl group, for example, tertiary butyl group, is treated in the presence of arylsulfonic-acid, it is converted without affecting the acid-amide bonding to the desired free acid.

A 2-hydro-3-hydroxy-3-indolylacetic acid derivative XVIII, the starting compound of the above process, is prepared by heating the mixture of alkyl halogenacetate and a corresponding 3-oxo-2,3-dihydro-indole derivative XVIII' with stirring in a nonpolar organic solvent in the presence of zinc powder and, if necessary, a small piece of iodine. One example of the above reaction is as follows:

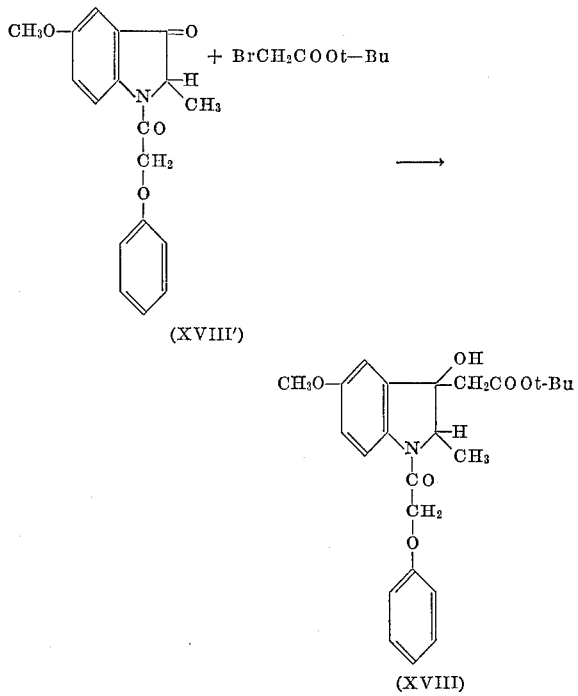

(XVIII')

(XVIII)

Still further, according to the present invention, a crude 1-acyl-3-indolylacetic acid derivative VIII is obtained by heating a γ-(N-acyl-anilino)-aliphatic acid derivative XXIX in the presence of a suitable catalyst or a dehydrating agent. The crude product thus obtained can be purified by recrystallization from a proper organic solvent or an aqueous organic solvent, or if the recrystallization fails, a column-chromatography can be used.

The γ-(N-acyl-anilino)-aliphatic acid derivative XXIX, which is a starting compound of this method, is generally prepared by following processes:

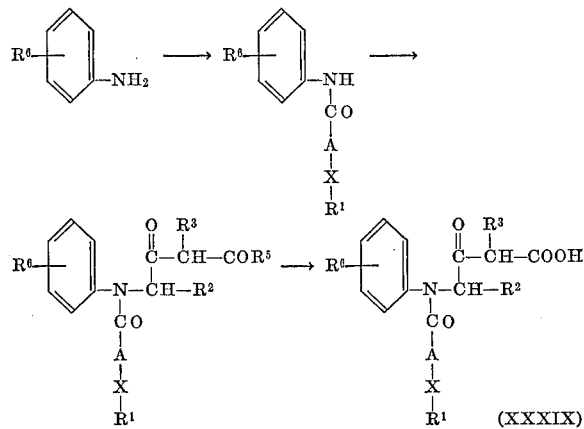

(XXXIX)

wherein $R^1$, $R^2$, $R^3$, $R^5$, $R^6$, A and X have the same meanings as identified above. For example, the reaction of p-anisidine with phenoxyacetyl chloride gives N-phenoxyacetyl p-anisidine, which is subjected to a reaction with tertiary-butyl γ-bromo-β-keto-valeriate to yield tertiary-butyl 4 - {N - (p - methoxyphenyl) - N - (phenoxyacetyl)}amino - 3 - oxovaleriate. And then the resultant tertiary-butyl 4 - {N-(p-methoxyphenyl) - N - (phenoxyacetyl)} amino-3-oxovaleriate is hydrolysed to give an oily substance of 4-{N-(p-methoxyphenyl)-N-(phenoxyacetyl)}amino-3-oxovaleric acid.

Among novel 3-indolyl aliphatic acid derivatives of the present invention, there are not a few useful compounds, which have not only excellent anti-inflammatory and anti-cholesterolamic activities but also extremely low toxicity. For example, as we can see from pharmacologically experimental results of the Table 1, the present compounds such as 1-phenoxyacetyl-2-methyl-5-methoxy-3-indolylacetic acid and 1-(β-naphthoxyacetyl)-2-methyl-5-methoxy-3-indolylacetic acid showed low toxicity in spite of their potential anti-inflammatory action. Therefore, we can say that their therapeutic ratio is much greater than that of other first class anti-inflammatory drugs.

TABLE 1

| Compound | Action | | Therapeutic ratio, $LD_{50}/ED_{50}$ |
|---|---|---|---|
| | $ED_{50}$,[1] mg./kg. | $LD_{50}$,[2] mg./kg. | |
| Phenylbutazone | 230 | 720 | 3.2 |
| 1-phenoxyacetyl-2-methyl-5-methoxy-3-indolylacetic acid (present compound) | 280 | >1,500 | >5.4 |
| 1-(β-naphthoxyacetyl)-2-methyl-5-methoxy-3-indolylacetic acid (present compound) | 330 | >1,500 | >4.6 |

[1] 50% inhibitory oral dose of edema induced in the rats' hind paw after injection of carrageenin.
[2] 50% lethal dose for one week after oral administration to rats.

Phenylbutazone is a representative anti-inflammatory drug and one of the best drugs which are most widely used now, but its effect is rather low in spite of high acute toxicity.

On the other hand, these compounds shown in the above table did not develop toxic symptoms in rats even after oral administration of more than 1,000 mg./kg. dose and its toxicity was minimum low. In these cases, occult bleeding in their feces was negative. But, the effects of the present compounds are considerably high in comparison with phenylbutazone, oxyphenbutazone and the like. Therefore, therapeutic ratios of these compounds are far greater than those of the first class non-steroidal anti-inflammatory drugs. It goes without saying that these compounds are extremely great valuable in practical field.

Further, these compounds also showed strong; anticholesterolemic action in animal test of hypercholesterolemia produced by a Triton (R 2030) administration.

For example, 1-phenoxyacetyl-2-methyl-5-methoxy-3-indolylacetic acid showed stronger anti-cholesterolemic activity in the animal test than two representative drugs of antihypercholesterolemia, nicotinic acid and CPIB (ethyl p-chlorophenoxy isobutyrate) as shown in Table 2.

TABLE 2.—ANTICHOLESTEROLEMIC ACTIVITY IN MOUSE OF HYPERCHOLESTEROLEMIA PRODUCED BY A TRITON (R 2030) ADMINISTRATION

| Compound | Oral dose, mg./kg. | Anticholesterolemic activity [1] |
|---|---|---|
| 1-phenoxyacetyl-2-methyl-5-methoxy-3-indolylacetic acid | 1,000 | +++ |
| | 250 | +++ |
| | 60 | + |
| Nicotinic acid | 2,000 | ++ |
| | 1,000 | + |
| | 500 | ± |
| CPIB | 1,000 | +++ |
| | 250 | ++ |
| | 60 | — |

[1] Anti-cholesterolemic activity was measured by cholesterol lowering level:
+++ = >60% of cholesterol lowering level.
++ = >40% of cholesterol lowering level.
+ = >20% of cholesterol lowering level.
± = >20% of cholesterol lowering level.
— = Noneffective.

The following examples are given to illustrate the present invention more particularly but it is not intended to limit the present invention only to them.

EXAMPLE 1

A mixture of 62 g. of acetaldehyde p-methoxyphenylhydrazone, 600 ml. of dry ether and 35.8 g. of dry pyridine was stirred and maintained at a temperature of 0°–5° C. while 100 g. of β-naphthoxyacetyl chloride was added dropwise. The reaction mixture was stirred for an additional 3 hours in an ice bath. The resultant crystals were collected by filtration and washed with water, ethanol, and then ether to give 90 g. of white crystals of acetaldehyde $N^1$-(β-naphthoxyacetyl)-$N^1$ (p-methoxyphenyl)hydrazone. The melting point was 125°–127° C.

By a similar method to Example 1, the following hydrazones were obtained.

EXAMPLE 2

Acetaldehyde $N^1$ - (phenoxyacetyl) - $N^1$ - (p-methoxyphenyl hydrazone.
Melting point: 128°–132° C.

EXAMPLE 3

Acetaldehyde $N^1$ - (p - tertiary - butyl - o - cresoxyacetyl)-$N^1$-(p-methoxyphenyl)hydrazone.
Melting point: 110°–111° C.

EXAMPLE 4

Acetaldehyde $N^1$ - (p-chlorophenoxyacetyl) - $N^1$ - (p-methoxyphenyl)hydrazone.
Melting point: 113°–115° C.

EXAMPLE 5

Acetaldehyde $N^1$-(β-phenylthiopropionyl)-$N^1$-(p-methoxyphenyl)hydrazone.
Melting point: 83°–84.5° C.

EXAMPLE 6

Acetaldehyde $N^1$-(phenoxyacetyl) - $N^1$-phenylhydrazone.
Melting point: 96°–98° C.

EXAMPLE 7

Acetaldehyde $N^1$-{β-(p-tolylthio) - propionyl}-$N^1$-(p-methoxyphenyl)hydrazone.
Melting point: 77°–80° C.

EXAMPLE 8

A mixture of 32.8 g. of acetaldehyde p-methoxyphenylhydrazone, 330 ml. of dry ether and 27 g. of dry pyridine was stirred and maintained at temperature 0°–5° C. while 56 g. of α-{p-chlorophenoxy}isobutyroyl chloride was added dropwise over 30 minutes. The reaction mixture was stirred for an additional 2.5 hours in an ice bath. The resultant crystals were removed by filtration, and 30 ml. of ethanol was added to the filtrate, and then dry gaseous hydrogen chloride was absorbed in the mixture over 1 hour at ice-salt temperatures. Excess hydrogen chloride was then removed under reduced pressure. A crystalline precipitate was isolated by filtration and washed with toluene to give 28 g. of $N^1$-(α-p-chlorophenoxy-isobutyroyl)-$N^1$ - (p-methoxyphenyl)hydrazine hydrochloride. The melting point was 164° C. (decomposition).

By a similar method to Example 8, the following hydrazines were obtained.

EXAMPLE 9

$N^1$-{β-(o-methoxyphenoxy)-propionyl} - $N^1$-(p-methoxyphenyl)hydrazine hydrochloride.
Melting point: 187° C. (decomposition).

EXAMPLE 10

$N^1$-(phenoxyacetyl) - $N^1$-(p-methoxyphenyl)hydrazine hydrochloride.
Melting point: 145°–147° C. (decomposition).

EXAMPLE 11

$N^1$-(p-tertiary-butylphenoxyacetyl) - $N^1$-(p-methoxyphenyl)hydrazine hydrochloride.
Melting point: 155° C. (decomposition).

EXAMPLE 12

A mixture of 9 g. of acetaldehyde $N^1$-(phenoxyacetyl)-$N^1$-(p-methoxyphenyl-hydrazone and 45 ml. of dry ethanol was cooled in an ice bath and nearly saturated with gaseous hydrogen chloride. The removal of excess hydrogen chloride and the addition of ether caused the precipitation of crystalline solid which was filtered, washed with ether and dried under reduced pressure to give 6.5 g. of crude crystals of $N^1$-(p-phenoxyacetyl)-$N^1$-(p-methoxyphenyl)hydrazine hydrochloride. Its melting point was 144°–146° C (decomposition). The hydrochloride was converted to $N^1$-(phenoxyacetyl)-$N^1$-(p-methoxyphenyl)hydrazine by an alkaline aqueous solution.

By a similar method to Example 12, the following hydrazines were obtained.

EXAMPLE 13

$N^1$-(p-chlorophenoxyacetyl) - $N^1$ - (p-methoxyphenyl)hydrazine hydrochloride.
Melting point: 148° C. (decomposition).

EXAMPLE 14

$N^1$-(β-phenylthiopropionyl) - $N^1$ - (p-methoxyphenyl)hydrazine hydrochloride.
Melting point: 171° C. (decomposition).

EXAMPLE 15

$N^1$-(β-phenylthiopropionoyl) - $N^1$ - (p-methoxyphenyl)hydrazine hydrochloride.
Melting point: 165° C. (decomposition).

EXAMPLE 16

$N^1$-(phenoxyacetyl) - $N^1$ - phenylhydrazine hydrochloride.
Melting point: 146°–150° C. (decomposition).

EXAMPLE 17

$N^1$-{β-(p - tolylthio)propionoyl} - $N^1$-(p-methoxyphenyl)hydrazine hydrochloride.
Melting point: 174° C. (decomposition).

EXAMPLE 18

A mixture of 5 g. of $N^1$-(β-naphthoxyacetyl)-$N^1$-(p-methoxyphenyl)hydrazine hydrochloride and 10 g. of levulinic acid was heated at 70°–80° C. for 2 hours with stirring. After the completion of reaction, the reaction mixture was allowed to stand at the room temperature, and poured into cold water. The resultant precipitate was collected by filtration, washed with water and recrystallized from acetone-water to give 2.5 g. of white plates of 1-(β-naphthoxyacetyl)-2-methyl-5-methoxy-3-indolylacetic acid. The melting point was 199°–200° C.

*Microanalysis.*—Calculated (percent): C, 71.45; H, 5.25; N, 3.47. Found (percent): C, 71.46; H, 5.32; N, 3.51.

By a similar method to Example 18, the following 3-indolylacetic acid derivatives were obtained.

EXAMPLE 19

1-(phenoxyacetyl)-2-methyl - 5-methoxy-3-indolylacetic acid.
Melting point: 176°—177° C.

*Microanalysis.*—Calculated (percent): C, 67.98; H, 5.42; N, 3.96. Found (percent): C, 68.09; H, 5.54; N, 4.14.

EXAMPLE 20

1-(p-tertiary - butylphenoxyacetyl)-2-methyl-5-methoxy-3-indolylacetic acid.
Melting point: 179.5°–180.5° C.

Appearance: White needles.
Microanalysis.—Calculated (percent): C, 70.40; H, 6.65; N, 3.42. Found (percent): C, 70.23; H, 6.70; N, 3.51.

EXAMPLE 21

1 - (p - chlorophenoxyacetyl) - 2 - methyl-5-methoxy-3-indolylacetic acid.
Melting point: 200°–201° C.
Appearance: White needles.
Microanalysis.—Calculated (percent): C, 61.94; H, 4.68; N, 3.61; Cl, 9.14. Found (percent): C, 62.26; H, 4.66; N, 3.66; Cl, 9.32.

EXAMPLE 22

1 - (α- p -chlorophenoxy - isobutyryl) - 2 - methyl - 5 - methoxy-3-indolylactic acid.
Melting point: 161°–161.5° C.
Appearance: White prisms.
Microanalysis.—Calculated (percent): C, 63.54; H, 5.33; N, 3.37; Cl, 8.53. Found (percent): C, 63.28; H, 5.30; N, 3.27; Cl, 8.37.

EXAMPLE 23

A mixture of 30 ml. of glacial acetic acid, 20 g. of levurinic acid and 10 g. of $N^1$-(3-phenylthiopropionyl)-$N^1$-(p-methoxyphenyl)hydrazine hydrochloride was heated for 2 hours at 75°–85° C. with stirring. After the completion of the reaction, the reaction mixture was allowed to cool and poured into cold water. The precipitate was collected by filtration, washed with water, and recrystallized from acetone-water twice to yield 7 g. of white needles of 1-(3'-phenylthiopropionyl)-2-methyl-5-methoxy-3-indolylacetic acid. The melting point was 148°–149° C.
Microanalysis.—Calculated (percent): C, 65.78; H, 5.52; N, 3.65; S, 8.36. Found (percent): C, 66.00; H, 5.65; N, 3.64; S, 8.33.

EXAMPLE 24

By a similar method to Example 21, 1-phenoxyacetyl-2-methyl-5-methoxy-3-indolylacetic acid was obtained. The melting point was 174°–175° C., which undepressed when admixed with authentic sample.

EXAMPLE 25

A mixture of 3.0 g. of $N^1$-(phenoxyacetyl)-$N^1$-(p-methoxyphenyl)hydrazine hydrochloride, 1.6 g. of acetonylmalonic acid and 10 ml. of acetic acid was heated for 4 hours at 85°–90° C. with stirring. After the completion of the reaction, the addition of 40 ml. of cold water caused precipitation of crystals, which were collected by filtration, washed with water and then a small quantity of acetone-water. Recrystallization from acetone gave 1-phenoxyacetyl-2-methyl-5-methoxy-3-indolylacetic acid. The melting point was 174°–176° C.

EXAMPLE 26

When acetosuccinic acid was used instead of acetonylmalonic acid, 1-phenoxyacetyl-2-methyl-5-methoxy-3-indolylacetic acid was obtained by a similar method to Example 24. The product was identified by infra-red spectra of authentic sample.

EXAMPLE 27

A mixture of 10 ml. of glacial acetic acid, 4.7 g. of 5-acetyl-n-valeric acid and 10 g. of $N^1$-phenoxyacetyl-$N^1$-(p-methoxyphenyl)hydrazine hydrochloric was heated for 2 hours at 75°–85° C. with stirring. After the completion of the reaction, the addition of water to the mixture caused precipitation of crystals, which were collected by filtration, washed with water and recrystallized from ethanol twice to give 5 g. of white needles of γ-{1-(phenoxyacetyl) - 2 - methyl-5-methoxy-3-indolyl}butyric acid. The melting point was 141°–142° C.

Microanalysis.—Calculated (percent): C, 69.25; H, 6.09; N, 3.67. Found (percent): C, 69.18; H, 5.98; N, 3.56.

EXAMPLE 28

A mixture of 3 g. of $N^1$-(phenoxyacetoimidoyl)-p-methoxyphenylhydrazine hydrochloride, 2 g. of levulinic acid and 10 ml. of acetic acid was heated at 85°–95° C. for 3 hours with stirring. After cooling, the reaction mixture was added to cold water, and then the resultant precipitate was collected by filtration, washed with water, and with acetone-water. The recrystalization from acetone gave 1-(phenoxyacetyl)-2-methyl-5-methoxy-3-indolylacetic acid, of which melting point was 174°–175° C.
Microanalysis.—Calculated (percent): C, 67.98; H, 5.42; N, 3.96. Found (percent): C, 68.03; H, 5.21; N, 3.63.

EXAMPLE 29

A mixture of 2.5 g. of benzyl 1-(phenoxyacetyl)-2-methyl-5-methoxy-3-indolylacetate, 0.6 g. of palladium-carbon catalyst, a few drops of acetic acid and 25 ml. of methanol was shaken in hydrogen gas at the room temperature. And the catalyst was then filtered off, and the filtrate was concentrated under reduced pressure to give crystals, which were collected by filtration. The recrystallization from ethanol-water gave 1-(phenoxyacetyl)-2-methyl-5-methoxyindole-3-acetic acid. The melting point was 175°–176° C.
Microanalysis.—Calculated (percent): C, 67.98; H, 5.42; N, 3.96. Found (percent): C, 68.11; H, 5.53; N, 4.14.

EXAMPLE 30

To a mixture of 3.4 g. of 1-phenoxyacetyl-2-methyl-5-methoxy-3-indolylacetamide and 40 ml. of dioxane was added 1 ml. of concentrated hydrochloric acid, and then 0.7 g. of sodium nitrite with stirring. After stirring for additional few hours, 160 ml. of cold water was added to the mixture, and the resultant solid was filtered. Recrystallization from ethanol-water, and then from acetone gave 1 - (phenoxyacetyl) - 2 - methyl-5-methoxy-3-indolylacetic acid, of which melting point was 174°–175° C. The product was identified by an infra-red spectra of authentic sample.

EXAMPLE 31

Tertiary butyl 1-(phenoxyacetyl)-2-methyl-5-methoxy-3-indolylacetate (2 g.) was heated at 210°–215° C. in nitrogen gas. After cooling, the reactant was added to ether and filtered. The filtrate was extracted with 5% sodium bicarbonate aqueous solution, and the water layer was acidified by dilute hydrochloric acid and extracted with ether. The ether layer was washed with water, dried and concentrated to oily residue, which was recrystallized from ethanol-water to give 1-(phenoxyacetyl)-2-methyl-5-methoxy-3-indolylacetic acid. The melting point was 174°–175° C.

EXAMPLE 32

A mixture of 3 g. of tertiary-butyl 1-(phenoxyacetyl)-2-methyl-5-methoxy-3-indolylacetate, 30 ml. of benzene and 1 g. of p-toluenesulfonic acid was refluxed for 2 hours. After cooling, the reaction mixture was washed with 50 ml. of water, and then the benzene layer was dried over anhydrous sodium sulfate and concentrated under reduced pressure to oily residue. Thereto 10 ml. of 50% ethanol was added, and the resultant precipitate was collected by filtration. Recrystallization from ethanol-water gave 1-(phenoxyacetyl)-2-methyl-5-methoxy-3-indolylacetic acid, of which melting point was 174°–175° C. The product was identified by an infra-red spectra of authentic sample.

EXAMPLE 33

A mixture of tertiary-butyl γ-{1-(phenoxyacetyl)-2-methyl-5-methoxy-3-indolyl}butyrate, 40 ml. of benzene and p-toluenesulfonic acid was refluxed. After the completion of the reaction, the mixture was allowed to cool, and washed with 7% sodium bicarbonate aqueous solution, and then with water twice. After drying, the mixture was distilled under reduced pressure to oily residue, which was purified with acetone and acetone-water to give γ-{1-(phenoxyacetyl) - 2 - methyl-5-methoxy-3-indolyl}butyric acid. The melting point was 140°–142° C.

*Microanalysis.*—Calculated (percent): C, 69.25; H, 6.09; N, 3.67. Found (percent): C, 69.01; H, 5.83; N, 3.75.

EXAMPLE 34

A mixture of 2 g. of N-(p-methoxyphenyl)-N-(phenoxyacetyl)-4-amino-5-oxovarelic acid and 1.3 g. of anhydrous zinc chloride was heated at 120°–140° C. for 50 minutes. After cooling, 30 ml. of benzene was added thereto and benzene insoluble substance was removed by filtration. The benzene solution was washed with water, dried with anhydrous sodium sulfate and concentrated under reduced pressure to brown solidal substance, which was recrystallize from acetone several times to give colorless crystals of 1-(phenoxyacetyl)-2-methyl-5-methoxy-3-indolylacetic acid. The melting point was 174°–175° C.

EXAMPLE 35

1 - (phenoxyacetyl) - 2 - methyl - 5 - methoxy - 3 - indolylacetoaldehyde (1.1 g.) was slowly added to a suspension of 1.1 g. of silver oxide in 30 ml. of benzene with stirring. After the addition, stirring was continued for additional 10 minutes. The reaction mixture was filtered and the filtrate was concentrated under reduced pressure to a solidal residue, which was recrystallized from alcohol to give colorless needles of 1-(phenoxyacetyl)-2-methyl-5-methoxy-3-indolylacetic acid. The melting point was 174°–175° C.

EXAMPLE 36

To a solution of 6 g. of 1-phenoxyacetyl-2-methyl-5-methoxy-3-indolylethanol in 70 ml. of acetone was added 5 g. of potassium permanganate at 50° C. After the addition, the heating with stirring was continued to complete the reaction. Thereafter, the reaction mixture was filtered, and the filtrate was concentrated under reduced pressure. The crystals were collected by filtration, and recrystallized from ethylacetate and ethanol to give colorless crystals of 1-(phenoxyacetyl)-2-methyl-5-methoxy-3-indolylacetic acid. The melting point was 174°–175° C.

*Microanalysis.*—Calculated (percent): C, 67.98; H, 5.42; N, 3.96. Found (percent): C, 68.10; H, 5.53; N, 4.12.

EXAMPLE 37

A mixture of 42 g. of tertiary-butyl 1-(phenoxyacetyl)-2 - methyl - 3 - hydroxy - 5 - methoxy - 2,3 - dihydro - 3-indolylacetate, 500 ml. of toluene and 3 g. of p-toluenesulfonic acid was heated at 100° C. for 3 hours. After the completion of the reaction, the mixture was washed with water three times, and the toluene layer was dried with anhydrous sodium sulfate. The filtrate as concentrated and allowed to stand in a refrigerator to give crude crystals of 1 - (phenoxyacetyl) - 2 - methyl - 5 - methoxy - 3 - indolylacetic acid. Recrystallization from acetone-water gave pure crystals, of which melting point was 173.5°–175° C.

*Microanalysis.*—Calculated (percent): C, 67.98; H, 5.43; N, 3.96. Found (percent): C, 67.83; H, 5.01; N, 3.65.

EXAMPLE 38

A mixture of 3.7 g. of 1-(phenoxyacetyl)-2-methyl-5-methoxy-2,3-dihydro-3-indolylacetic acid, 100 ml. of benzene and 7.5 g. of chloranil was refluxed for 3 hours. Thereafter the mixture was concentrated under reduced pressure to solidal residue, which was extracted with acetone. An insoluble substance was removed by filtration, and an acetone solution was concentrated to dryness. Recrystallization from acetone-water gave light yellow crystals of 1-(phenoxyacetyl)-2-methyl-5-methoxy-3-indolylacetic acid. The melting point was 174°–175° C.

What is claimed is:
1. 1-phenoxyacetyl-2-methyl-5-methoxy-3-indolylacetic acid.
2. 1 - (β-naphthoxyacetyl)-2-methyl-5-methoxy-3-indolylacetic acid.

References Cited

UNITED STATES PATENTS 3,190,889   6/1965   Shen _____ 260—326.13X

ALEX MAZEL, Primary Examiner

J. A. MARCAVAGE, Assistant Examiner

U.S. Cl. X.R.

260—326.11, 326.12, 326.16, 240, 518, 588; 424—274, 324